Nov. 5, 1929.  J. APPLETON  1,734,787
CENTERING DEVICE FOR BORING AND GRINDING MACHINES
Filed Nov. 19, 1923
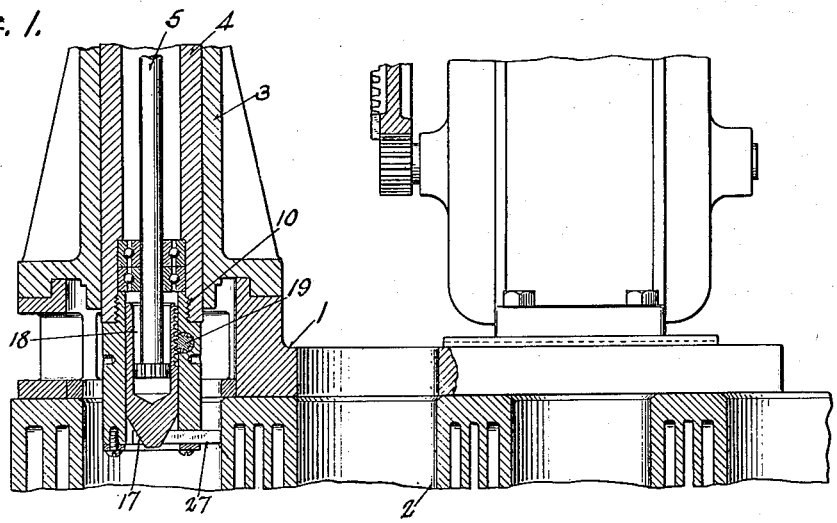
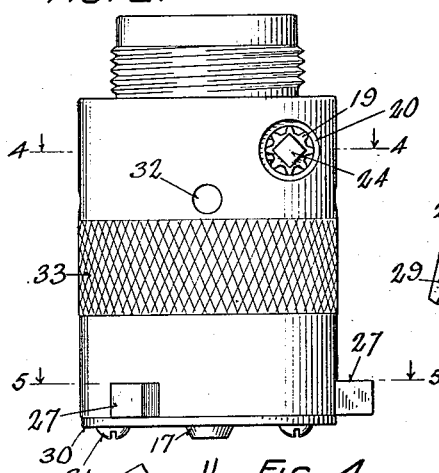
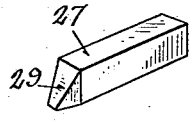
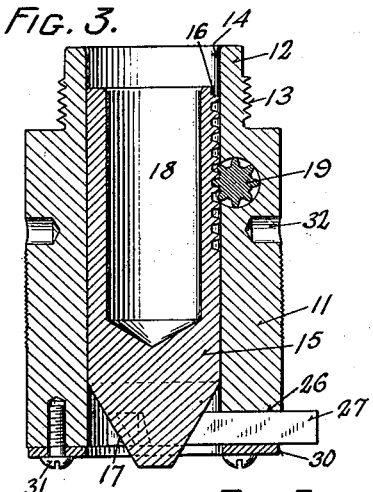
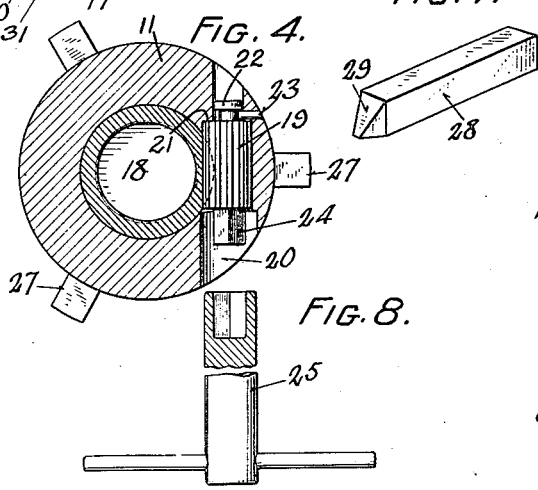
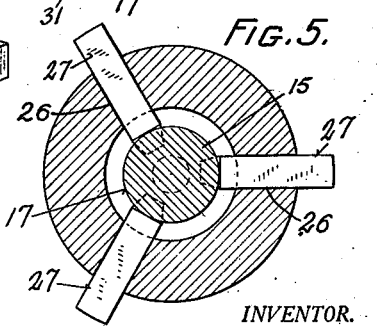
INVENTOR.
Joseph Appleton
BY
Edwin B. H. Tower, Jr.
ATTORNEY.

Patented Nov. 5, 1929

1,734,787

UNITED STATES PATENT OFFICE

JOSEPH APPLETON, OF PORT WASHINGTON, WISCONSIN, ASSIGNOR TO SIMPLICITY ENGINE & MANUFACTURING COMPANY, OF PORT WASHINGTON, WISCONSIN, A CORPORATION OF WISCONSIN

CENTERING DEVICE FOR BORING AND GRINDING MACHINES

Application filed November 19, 1923. Serial No. 675,637.

This invention relates to centering tools for boring and grinding machines.

The centering tool to which the invention applies in particular has a tool head for attachment to the tool shaft of a boring machine or the like and radially adjustable members arranged in the tool head to aline the tool shaft with the cylinder to be bored or ground.

An object of the invention is to provide a centering tool for quickly and accurately centering the tool shaft of a machine with a bore or cylinder at a point intermediate the ends thereof.

Another object is to provide a centering tool which is sturdy and efficient.

Other objects and advantages will appear hereinafter.

According to the invention, the centering members are extended by a plunger which is reciprocated by gearing operable from the outside of the tool head.

A centering tool embodying the invention is shown in the accompanying drawing in which the views are as follows:

Fig. 1 is a central vertical section showing the tool attached to a boring and grinding machine.

Fig. 2 is an elevation of the tool.

Fig. 3 is a central vertical section therethrough.

Fig. 4 is a sectional plan on the line 4—4 of Fig. 2.

Fig. 5 is a sectional plan on the line 5—5 of Fig. 2.

Figs. 6 and 7 are perspective views of centering members.

Fig. 8 shows a key for operating the tool.

The centering tool is shown applied to the boring and grinding machine disclosed in Patent No. 1,708,798, issued April 9, 1929, to Nels A. Nelson, but the invention is applicable to other machines.

The machine has a base 1 for supporting the same upon the article to be bored or ground, such as the cylinder block 2 of an internal combustion engine.

A standard or column 3 is carried by the base 1 and provides a bearing for a tubular tool shaft 4 which is rotatable and slidable therein.

Either a boring tool or a grinding tool may be attached to the shaft 4 and be rotated and moved vertically thereby.

A driving shaft 5 is journaled in the shaft 4 and adapted to rotate independently thereof to drive the grinding wheel of the grinding tool.

The lower end of the shaft 4 is provided with internal threads 10 for attaching the tools thereto.

The centering tool has a tool body or head 11 which is provided with an extension 12 having threads 13 thereon for engagement with the threads 10 in the shaft 4.

The tool head 11 has a central bore 14 to receive a plunger 15 which preferably has a sliding fit therein.

The plunger 15 has teeth formed in one side thereof to provide a rack 16, a conical lower end 17 to engage the centering members, and a central bore 18 to receive the lower end of the shaft 5 when the tool is attached to a machine of this character.

The plunger 15 is reciprocated by a pinion 19 which engages the rack 16 and is arranged in a bore 20 formed in the body 11 at right angles to and intersecting the bore 14.

The bore 20 is reduced in diameter at one side of the bore 14 to provide a shoulder 21, to take the thrust exerted against the pinion 19 when the same is rotated, and a bearing for the axle 22 of the pinion 19.

A pin 23 in the head 11 engages a groove in the axle 22 and holds the pinion 19 in the bore 20.

The pinion 19 is provided with a head or extension 24 which is angular in cross-section and adapted to be engaged by a wrench 25 to rotate the pinion 19 and reciprocate the plunger 15.

The lower end of the head 11 is provided with slots 26 to receive centering members 27 or 28 which are identical except for the lengths thereof and each tool may be provided with two or more centering members to adapt the same to bores or cylinders of widely varying diameters.

The inner end of each centering member is provided with a beveled surface 29 to provide an even bearing against the conical end 17 of the plunger 15 and the outer end of each is preferably rounded.

The centering members are retained in the slots 26 by an annular plate 30 which is secured to the head 11 by screws 31.

The head 11 may have wrench sockets 32 formed therein and be provided with a knurled part 33 to facilitate attaching the tool to a machine.

The centering tool is attached to the tool shaft of the machine and lowered into the cylinder to be bored or ground until the centering members are opposite the point at which it is desired to center the machine.

The wrench 25 is then employed to rotate the pinion 19 and move the plunger 15 downwardly to force the ends of the centering members against the wall of the cylinder.

The pressure exerted by the centering members against the wall of the cylinder moves the machine on the cylinder block and brings the tool shaft thereof positively into alinement with the cylinder.

The machine is rigidly secured to the cylinder block before the pressure upon the centering members is released and then the plunger 15 is retracted and the centering tool removed from the machine.

The invention herein set forth is susceptible of various modifications and adaptations without departing from the scope thereof as hereafter claimed.

The invention is hereby claimed as follows:—

1. A centering tool comprising a head for attachment to a machine for boring or grinding a cylinder, means carried by said head to engage the cylinder on the inside thereof, a plunger arranged in said head to operate said means, a gear arranged in said head to operate said plunger, and means engaging said gear for operating the same from the outside of said head.

2. A centering tool comprising a head for attachment to a machine for boring or grinding a cylinder, means carried by said head to engage the cylinder on the inside thereof, a plunger arranged in said head to operate said means, a gear carried by said head for engagement with said plunger to operate the same, and means engaging said gear for operating the same from the outside of said head.

3. A centering tool comprising a head for attachment to a machine for boring or grinding a cylinder, means projecting from said head to engage the cylinder on the inside thereof, a plunger carried by said head to operate said means, gearing contained within said head to operate said plunger, and an operating member extending laterally through said head to operate said gearing from the outside of said head.

4. A centering tool comprising a head for attachment to a machine for boring or grinding a cylinder, means projecting from said head to engage the cylinder on the inside thereof, a plunger carried by said head to equally and simultaneously extend said means, gearing contained within said head to operate said plunger, and an operating member extending laterally through said head to operate said gearing from the outside of said head.

5. A centering tool comprising a head for attachment to a machine for boring or guiding a cylinder, radially movable members carried by said head to engage the inner walls of the cylinder, a non-rotary plunger arranged in said head and having angular surfaces to move said members radially, means contained within said head to move said plunger axially, and an operating member extending laterally through said head to enable said means to be operated from the outside of said head.

6. A centering tool comprising a head for attachment to a machine for boring or grinding a cylinder, radially movable members carried by said head to engage the inner walls of the cylinder, a non-rotary plunger arranged in said head and having angular surfaces to move said members radially, teeth arranged on said plunger, and a pinion arranged in said head to engage said teeth to move said plunger axially.

7. A centering tool comprising a head, members carried thereby and movable radially to be projected therefrom, a slidable plunger arranged within said head and having a cam face to engage said members and move the same axially, and gearing contained within said head to operate said plunger and operable from the outside of said head.

8. A centering tool comprising a head, members carried thereby and movable radially to be projected therefrom, a slidable plunger arranged within said head and having a cam face to engage said members and move the same axially, a rack arranged axially upon said plunger, and a pinion engaging said rack and carried by said head and having its shaft extending through said head to enable said pinion to be turned from the outside of said head.

In witness whereof, I have hereunto subscribed my name.

JOSEPH APPLETON.